United States Patent
Lwowski et al.

(10) Patent No.: US 12,406,037 B2
(45) Date of Patent: Sep. 2, 2025

(54) SYSTEM AND METHOD FOR DIGITAL STEGANOGRAPHY PURIFICATION

(71) Applicant: Booz Allen Hamilton Inc., McLean, VA (US)

(72) Inventors: Jonathan Richard Lwowski, San Antonio, TX (US); Isaac Alexander Corley, San Antonio, TX (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 990 days.

(21) Appl. No.: 17/123,948

(22) Filed: Dec. 16, 2020

(65) Prior Publication Data

US 2021/0192019 A1 Jun. 24, 2021

Related U.S. Application Data

(60) Provisional application No. 62/949,754, filed on Dec. 18, 2019.

(51) Int. Cl.
*G06F 21/16* (2013.01)
*G06T 3/4007* (2024.01)
(Continued)

(52) U.S. Cl.
CPC ............ *G06F 21/16* (2013.01); *G06T 3/4007* (2013.01); *G06F 21/1066* (2023.08); *G06N 3/04* (2013.01); *G06N 3/08* (2013.01)

(58) Field of Classification Search
CPC ... G06F 21/16; G06F 21/1066; G06T 3/4007; G06T 2201/0202; G06T 1/005;
(Continued)

(56) References Cited

U.S. PATENT DOCUMENTS 6,571,021 B1 * 5/2003 Braudaway ............... G06T 3/02
382/275
6,665,417 B1 * 12/2003 Yoshiura ............... G06T 1/0028
713/176
(Continued)

OTHER PUBLICATIONS

Volkhonskiy et al, Steganographic generative adversarial networks, Jan. 2020, Proc. SPIE, Twelfth International Conference on Machine Vision (ICMV 2019).*
(Continued)

*Primary Examiner* — David Garcia Cervetti
(74) *Attorney, Agent, or Firm* — Buchanan Ingersoll & Rooney, PC

(57) ABSTRACT

Exemplary systems and methods are disclosed for removing steganography from digital data is disclosed. The method and system involve receiving a digital data. At least one processing device accesses a steganography purifier model. The at least one processing device includes at least a generator configured to scale a magnitude of individual data elements of the digital data from a first value range to a second value range. The scaled data elements are downsampled to remove steganography data embedded in the digital data and produce a purified version. The purified version is upsampled by interpolating new data elements between one or more adjacent data elements to provide an upsampled purified version. The magnitude of the data elements of the upsampled purified version are scaled from the second value range to the first value range to generate a purified output version.

22 Claims, 14 Drawing Sheets

(51) Int. Cl.
    *G06F 21/10* (2013.01)
    *G06N 3/04* (2023.01)
    *G06N 3/08* (2023.01)
(58) Field of Classification Search
    CPC ............ G06N 3/04; G06N 3/08; G06N 3/045;
                    G06N 3/047; G06N 3/088; G10L 19/018
    See application file for complete search history.

(56) References Cited

U.S. PATENT DOCUMENTS

| | | | | |
|---|---|---|---|---|
| 6,674,876 | B1* | 1/2004 | Hannigan | H04N 21/8358 713/176 |
| 6,813,366 | B1* | 11/2004 | Rhoads | H04N 1/32288 707/E17.112 |
| 6,944,298 | B1* | 9/2005 | Rhoads | G11B 20/0021 382/100 |
| 7,956,930 | B2* | 6/2011 | Sullivan | H04N 7/0102 348/581 |
| 8,737,832 | B1* | 5/2014 | Lin | H04N 23/70 396/234 |
| 8,867,860 | B2* | 10/2014 | Lyons | G06F 1/02 382/100 |
| 9,015,494 | B2* | 4/2015 | Fischer | G09C 5/00 713/189 |
| 9,690,967 | B1* | 6/2017 | Brundage | G06T 1/005 |
| 10,147,433 | B1* | 12/2018 | Bradley | G10L 19/018 |
| 10,182,170 | B1* | 1/2019 | Evans | G07D 7/005 |
| 10,339,664 | B2* | 7/2019 | Rhoads | G06T 7/33 |
| 10,410,322 | B2* | 9/2019 | Viswanathan | G06T 3/4053 |
| 10,547,858 | B2* | 1/2020 | Wang | G06N 3/08 |
| 10,839,487 | B2* | 11/2020 | Stewart | G06T 5/73 |
| 10,896,307 | B2* | 1/2021 | Sharma | G06K 7/1417 |
| 10,958,869 | B1* | 3/2021 | Chi | H04N 11/02 |
| 10,986,356 | B2* | 4/2021 | Kim | H04N 19/184 |
| 11,037,274 | B2* | 6/2021 | Vogels | G06V 10/454 |
| 11,043,226 | B2* | 6/2021 | Ravelli | G10L 19/038 |
| 11,062,108 | B2* | 7/2021 | Bradley | G06K 7/1443 |
| 11,130,042 | B2* | 9/2021 | Tran | A63B 71/145 |
| 11,164,295 | B2* | 11/2021 | Stewart | G06T 5/70 |
| 11,315,467 | B1* | 4/2022 | Mandle | G02B 5/201 |
| 11,367,159 | B1* | 6/2022 | Holub | G06T 1/0021 |
| 11,438,632 | B2* | 9/2022 | Yin | H04N 19/70 |
| 12,073,487 | B2* | 8/2024 | Kamath | G06T 1/0028 |
| 2003/0091189 | A1* | 5/2003 | Rhoads | H04K 1/02 380/252 |
| 2003/0137697 | A1* | 7/2003 | Sato | G06T 3/403 358/3.06 |
| 2006/0050957 | A1* | 3/2006 | Naccari | G06T 7/90 382/165 |
| 2007/0036357 | A1* | 2/2007 | Van der Veen | G10L 19/018 380/246 |
| 2007/0171288 | A1* | 7/2007 | Inoue | G06T 3/00 348/241 |
| 2007/0223592 | A1* | 9/2007 | Rhoads | G06T 1/005 375/240.24 |
| 2007/0286451 | A1* | 12/2007 | Rhoads | H04N 1/32144 382/100 |
| 2008/0263359 | A1* | 10/2008 | Radzishevsky | H04N 1/32304 713/176 |
| 2009/0015710 | A1* | 1/2009 | Hirasawa | H04N 5/917 348/E7.001 |
| 2011/0026593 | A1* | 2/2011 | New | H04N 19/18 375/E7.243 |
| 2012/0163655 | A1* | 6/2012 | Tanaka | H04N 19/467 382/100 |
| 2012/0239387 | A1* | 9/2012 | Ben-David | G10L 21/003 704/E19.01 |
| 2012/0300976 | A1* | 11/2012 | Tanaka | H04N 1/32309 382/224 |
| 2013/0019106 | A1* | 1/2013 | Fischer | G06F 21/60 713/189 |
| 2015/0278980 | A1* | 10/2015 | Sinclair | G06T 1/0064 382/100 |
| 2015/0312579 | A1* | 10/2015 | Sim | H04N 19/176 375/240.08 |
| 2017/0084006 | A1* | 3/2017 | Stewart | G06F 16/51 |
| 2017/0103285 | A1* | 4/2017 | Le Borgne | G06T 3/4007 |
| 2018/0293706 | A1* | 10/2018 | Viswanathan | G06T 3/4046 |
| 2019/0171856 | A1* | 6/2019 | Sharma | G06K 19/06103 |
| 2019/0205694 | A1* | 7/2019 | Wang | G06V 40/165 |
| 2019/0213705 | A1* | 7/2019 | Kamath | G06N 3/045 |
| 2019/0266749 | A1* | 8/2019 | Rhoads | G06T 1/0064 |
| 2019/0304069 | A1* | 10/2019 | Vogels | G06T 15/06 |
| 2019/0332840 | A1* | 10/2019 | Sharma | G06K 7/1447 |
| 2019/0378235 | A1* | 12/2019 | Kamath | H04N 1/3232 |
| 2019/0385288 | A1* | 12/2019 | Stewart | G06T 5/70 |
| 2020/0019857 | A1* | 1/2020 | Wang | G06N 3/08 |
| 2020/0043138 | A1* | 2/2020 | Chou | G06T 7/90 |
| 2020/0162751 | A1* | 5/2020 | Kim | H04N 19/14 |
| 2020/0184212 | A1* | 6/2020 | Anthony Samy | G06N 20/20 |
| 2020/0250513 | A1* | 8/2020 | Krishnamoorthy | G06N 3/048 |
| 2020/0304794 | A1* | 9/2020 | Lai | H04N 19/159 |
| 2020/0349682 | A1* | 11/2020 | Mayol Cuevas | G06V 10/776 |
| 2020/0349686 | A1* | 11/2020 | Shapovalova | G06T 5/20 |
| 2020/0410335 | A1* | 12/2020 | Gu | G06V 10/776 |
| 2021/0125313 | A1* | 4/2021 | Bai | G06V 10/806 |
| 2021/0150312 | A1* | 5/2021 | Lwowski | G06V 10/809 |
| 2021/0150354 | A1* | 5/2021 | Karras | G06N 3/088 |
| 2021/0150769 | A1* | 5/2021 | Babaheidarian | G06F 18/2193 |
| 2021/0192019 | A1* | 6/2021 | Lwowski | G06T 1/005 |
| 2021/0227231 | A1* | 7/2021 | Hannuksela | H04N 19/176 |
| 2021/0365716 | A1* | 11/2021 | Li | G06V 10/764 |
| 2022/0007029 | A1* | 1/2022 | Deng | G06F 7/78 |
| 2022/0051604 | A1* | 2/2022 | Bogdanowicz | G02B 5/201 |
| 2022/0165198 | A1* | 5/2022 | Bogdanowicz | G09G 3/346 |
| 2022/0262002 | A1* | 8/2022 | Wang | G06V 10/454 |
| 2023/0051960 | A1* | 2/2023 | Sonneveldt | G06N 3/042 |
| 2024/0412266 | A1* | 12/2024 | Usui | G06N 20/00 |

OTHER PUBLICATIONS

Cao et al, Resampling detection of recompressed images via dual-stream convolutional neural network, May 2019, Mathematical Biosciences and Engineering.*
Corley et al, Destruction of Image Steganography using Generative Adversarial Networks, Dec. 2019, arXiv.*
Huang et al, Image steganography using texture features and GANs, Jul. 2019, IEEE.*
Tan et al., Pixel-Decimation-Assisted Steganalysis of Synchronize-Embedding-Changes Steganography, Jul. 2017, IEEE.*
El-Emam et al., A novel algorithm for colour image steganography using a new intelligent technique based on three phases, Sep. 2015, Elsevier.*
Duan et al., Reversible Image Steganography Scheme Based on a U-Net Structure, Jan. 2019, IEEE.*
Hayes et al., Generating steganographic images via adversarial training, Jul. 2017, arXiv.*
Meng et al., A Fusion Steganographic Algorithm Based on Faster R-CNN, 2018, Tech Science Press.*
Liu et al., Image Deblocking Detection Based on a Convolutional Neural Network, Mar. 2019, IEEE.*
Meng et al., A Fusion Steganographic Algorithm Based on Faster R-CNN, 2018, Tech Science Press. (Year: 2018).*
Liu et al., Image Deblocking Detection Based on a Convolutional Neural Network, Mar. 2019, IEEE. (Year: 2019).*
Hayes et al., Generating steganographic images via adversarial training, Jul. 2017, arXiv. (Year: 2017).*
Duan et al., Reversible Image Steganography Scheme Based on a U-Net Structure, Jan. 2019, IEEE. (Year: 2019).*
El-Emam et al., A novel algorithm for colour image steganography using a new intelligent technique based on three phases, Sep. 2015, Elsevier. (Year: 2015).*
Tan et al., Pixel-Decimation-Assisted Steganalysis of Synchronize-Embedding-Changes Steganography, Jul. 2017, IEEE. (Year: 2017).*
Volkhonskly et al, Steganographic generative adversarial networks, Jan. 2020, Proc. SPIE, Twelfth International Conference on Machine Vision (ICMV 2019). (Year: 2019).*

(56) References Cited

OTHER PUBLICATIONS

Cao et al, Resampling detection of recompressed images via-dual-stream convolutional neural network, May 2019, Mathematical Biosciences and Engineering. (Year: 2019).*
Corley et al., Destruction of Image Steganography using Generative Adversarial Networks, Dec. 2019, arXiv. (Year: 2019).*
Huang et al., Image steganography using texture and GANs, Jul. 2019, IEEE. (Year: 2019).*
"Apt37." [Online]. Available: https://attack.mitre.org/groups/G0067/.
Msfvenom, [Online]. Available: https://www.offensivesecurity.com/metasploit- unleashed/msfvenom/.
Al-Naima, F., et al., "Destroying steganography content in image files, " in The 5th International Symposium on Communication Systems, Networks and DSP (CSNDSP'06), Greece, 2006.
Ameen, S. Y., et al., "Optimal image steganography content destruction techniques,", in International Conference on Systems, Control, Signal Processing and Informatics, 2013, pp. 453-457.
Amritha, P., et al., "Active warden attack on steganography using prewitt filter,", in Proceedings of the International Conference on Soft Computing Systems. Springer, 2016, pp. 591-599.
Amritha, P., et al., "Anti-forensic approach to remove stego content from images and videos," Journal of Cyber Security and Mobility, vol. 8, No. 3, pp. 295-320, 2019.
Amritha, P., et al., "On the removal of steganographic content from images," Defence Science Journal, vol. 66, No. 6, pp. 574-581, 2016.
Baluja, S., "Hiding images in plain sight: Deep steganography," in Advances in Neural Information Processing Systems, 2017, pp. 2069-2079.
Bas, P., et al., "Break our steganographic system": the ins and outs of organizing boss, in International workshop on information hiding. Springer, 2011, pp. 59-70.
Bender, W., et al., "Techniques for data hiding", IBM systems journal, vol. 35, No. 3.4, pp. 313-336, 1996.
Butterworth, S., et al., "On the theory of filter amplifiers," Wireless Engineer, vol. 7, No. 6, pp. 536-541, 1930.
Chang, S. G., et al., "Adaptive wavelet thresholding for image denoising and compression," IEEE transactions on image processing, vol. 9, No. 9, pp. 1532-1546, 2000.
Cox, I., et al., "Digital watermarking and steganography", Morgan kaufmann, 2007.
Daubechies, I., "Ten lectures on wavelets", Siam, 1992, vol. 61.
Essenwanger, O. M., "Elements of statistical analysis," 1986.
Fridrich, J., "Steganographic algorithms," [Online]. Available: http://dde.binghamton.edu/download/stego algorithms/.
Goodfellow, I., et al., "Generative adversarial nets," in Advances in neural information processing systems, 2014, pp. 2672-2680.
He, K., et al., "Deep residual learning for image recognition," in Proceedings of the IEEE conference on computer vision and pattern recognition, 2016, pp. 770-778.
Holub, V., et al., "Designing steganographic distortion using directional filters," in 2012 IEEE International workshop on information forensics and security (WIFS). IEEE, 2012, pp. 234-239.
Holub, V., et al., "Universal distortion function for steganography in an arbitrary domain," EURASIP Journal on Information Security, vol. 2014, No. 1, p. 1, 2014.
Jung, D., et al., "Pixelsteganalysis: Destroying hidden information with a low degree of visual degradation," arXiv preprint arXiv:1902.11113, 2019.
Kingma, D. P., et al., "Adam: A method for stochastic optimization," arXiv preprint arXiv:1412.6980, 2014.
Ledig, C., et al., "Photo-realistic single image super-resolution using a generative adversarial network," in Proceedings of the IEEE conference on computer vision and pattern recognition, 2017, pp. 4681-4690.
Li, B., et al., "A new cost function for spatial image steganography," in 2014 IEEE International Conference on Image Processing (ICIP). IEEE, 2014, pp. 4206-4210.
Nagrani, A., et al., "Voxceleb: a largescale speaker identification dataset," in Interspeech, 2017.
Nair, V., et al., "Rectified linear units improve restricted boltzmann machines," in Proceedings of the 27th international conference on machine learning (ICML-10), 2010, pp. 807-814.
Pevn'y, T., et al., "Using high-dimensional image models to perform highly undetectable steganography," in International Workshop on Information Hiding. Springer, 2010, pp. 161-177.
Salimans, T., et al., "Pixelcnn++: Improving the pixelcnn with discretized logistic mixture likelihood and other modifications," arXiv preprint arXiv:1701.05517, 2017.
Sharp, A., et al., "A novel active warden steganographic attack for next-generation steganography," in 2013 9th International Wireless Communications and Mobile Computing Conference (IWCMC). IEEE, 2013, pp. 1138-1143.
Shrestha, P. L., et al., "A general attack method for steganography removal using pseudo-cfa re-interpolation," in 2011 International Conference for Internet Technology and Secured Transactions. IEEE, 2011, pp. 454-459.
Smith, C. B., et al., "Denoising and the active warden," in 2007 IEEE International Conference on Systems, Man and Cybernetics. IEEE, 2007, pp. 3317-3322.
Wang, Z., et al., "A universal image quality index," IEEE signal processing letters, vol. 9, No. 3, pp. 81-84, 2002.
Wang, Z., et al., "Image quality assessment: from error visibility to structural similarity," IEEE transactions on image processing, vol. 13, No. 4, pp. 600-612, 2004.
Wayner, P., "Disappearing cryptography: information hiding: steganography and watermarking" Morgan Kaufmann, 2009.
Westfeld, A., et al., "Attacks on steganographic systems," in International workshop on information hiding. Springer, 1999, pp. 61-76.
Zhang, R., et al., "Invisible steganography via generative adversarial networks," Multimedia Tools and Applications, vol. 78, No. 7, pp. 8559-8575, 2019.

\* cited by examiner

SYSTEM AND METHOD FOR DIGITAL STEGANOGRAPHY PURIFICATION

FIELD

The present disclosure is related to methods and systems for removing steganography from digital data.

BACKGROUND

Steganography comprises various techniques of concealing data or information within other exposed or visible data or information used as a host. Digital image steganography involves having hidden text or data within a host image. Steganography increasingly poses a threat to the security of computer systems and networks. Bad actors can embed malicious payloads including program code, a shellcode, or scripts into an image, which is transmitted to a computer system or computing network. Once the image is downloaded to the computer system or network, the payload can be executed to control or exploit system or network operation.

Due to the highly undetectable nature of current state-of the art steganography algorithms, adversaries are able to evade defensive tools such as Intrusion Detection Systems (IDS) and/or Antivirus (AV) software which utilize heuristic and rule-based techniques for detection of malicious activity. However, these methods struggle to detect advanced steganography algorithms, which embed data using unique patterns based on the content of each individual file of interest. This results in high false positive rates when detecting steganography and poor performance when deployed, effectively making it unrealistic to perform preventative measures such as blocking particular images or traffic from being transmitted within the network. Furthermore, image steganalysis techniques are typically only capable of detecting a small subset of all possible images, limiting them to only detect images of a specific size, color space, or file format.

Known systems and techniques are designed to eliminate steganography contained in digital images using filtering to remove steganographic content making it unusable by a potential adversary. These systems and techniques, however, result in degradation of image quality that is perceptible to the human eye. See, for example, [5] "Attacks on steganographic systems" which uses generic filters to obfuscate/remove steganography; [6] "Pixelsteganalysis" which uses a neural network to build pixel distribution which is then used to manually remove steganographic content. This only works on lossy neural network based steganography which embeds images into other images; [10] "Anti-forensic approach to remove stego content from images and videos", which uses generic filters to obfuscate/remove steganography; [11] "On the removal of steganographic content from images" which uses generic filters to obfuscate/remove steganography; [12] "Optimal image steganography content destruction techniques" which uses generic filters to obfuscate/remove steganography; [13] "A novel active warden steganographic attack for next-generation steganography" which uses generic filters to obfuscate/remove steganography; [14] "Destroying steganography content in image files" which uses generic filters to obfuscate/remove steganography; [15] "A general attack method for steganography removal using pseudo-cfa re-interpolation" which uses generic filters to obfuscate/remove steganography; [16] "Active warden attack on steganography using prewitt filter" which uses generic filters to obfuscate/remove steganography; [17] "Denoising and the active warden" which uses generic filters to obfuscate/remove steganography. The entire content of each of the foregoing references is incorporated by reference.

SUMMARY

An exemplary system for removing steganography from digital data is disclosed, comprising: a receiving device configured to receive digital data including at least one of image data and audio data; and at least one processing device configured to access a steganography purifier model having at least a generator configured to: scale a magnitude of individual data elements of the digital data from a first value range to a second value range, downsample the scaled data elements to remove steganography data embedded in the digital data and produce a purified version of the digital data, upsample the purified version of the digital data by interpolating new data elements between one or more adjacent data elements to provide an upsampled purified version of the digital data, and scale the data elements of the upsampled purified version of the digital data from the second value range to the first value range to generate a purified output version of the received digital data.

An exemplary method for removing steganography from digital data is disclosed, the method comprising: receiving, in a receiving device, digital data including at least one of image data and audio data; scaling, in at least one processing device having an encoder of a steganography purifier model, a magnitude of individual data elements of the digital data from a first value range to a second value range; downsampling, in the encoder architecture of the at least one processing device, the scaled data elements to remove steganography data embedded in the digital data and produce a purified version of the digital data; upsampling, in the at least one processing device having a decoder of a steganography purifier model, the purified version of the digital data by interpolating new data elements between one or more adjacent data elements to provide an upsampled purified version of the digital data; and scaling, in the decoder architecture of the at least one processing device, the data elements of the upsampled purified version of the digital data from the second value range to the first value range to generate a purified output version of the received digital data.

An exemplary method of training a system for removing steganography from digital data is disclosed, the system having a receiving device and at least one processing device configured to execute or having access to a steganography purifier model having at least a generator for generating purified digital data and a discriminator for distinguishing between the purified digital data and cover data, the method comprising: receiving, in the receiving device, a plurality of digital datasets including steganography, each digital dataset including one of image data and audio data; scaling, via the generator of the at least one processing device, a magnitude of individual data elements of the digital dataset from a first value range to a second value range; downsampling, via the generator of the at least one processing device, the digital dataset with the scaled elements to remove steganography data embedded in the digital dataset and produce a purified version of the digital dataset; upsampling, via the generator of the at least one processing device, the purified version of the digital dataset by interpolating data between one or more adjacent data elements to provide an upsampled purified version of the digital dataset; scaling, via the generator of the at least one processing device, the data elements of the upsampled purified version from the second value range to the first value range to generate a purified output version of the received digital dataset; receiving, in the discriminator of the at least one processing device, the purified output version of the received digital dataset and a reference digital dataset, which corresponds to the digital data received by the receiving device; and determining, via the discriminator of the at least one processing device, which of the purified version of the received digital dataset and the reference digital dataset contained steganography.

BRIEF DESCRIPTION OF THE DRAWINGS

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure are directed to methods and systems for steganography detection in a digital image. The one or more processing devices can be configured to access and/or execute a deep neural network for performing image steganography removal across a plurality of steganography algorithms and embedding rates, to remove steganography that is present in a digital image without degrading visual quality.

Figure 1:
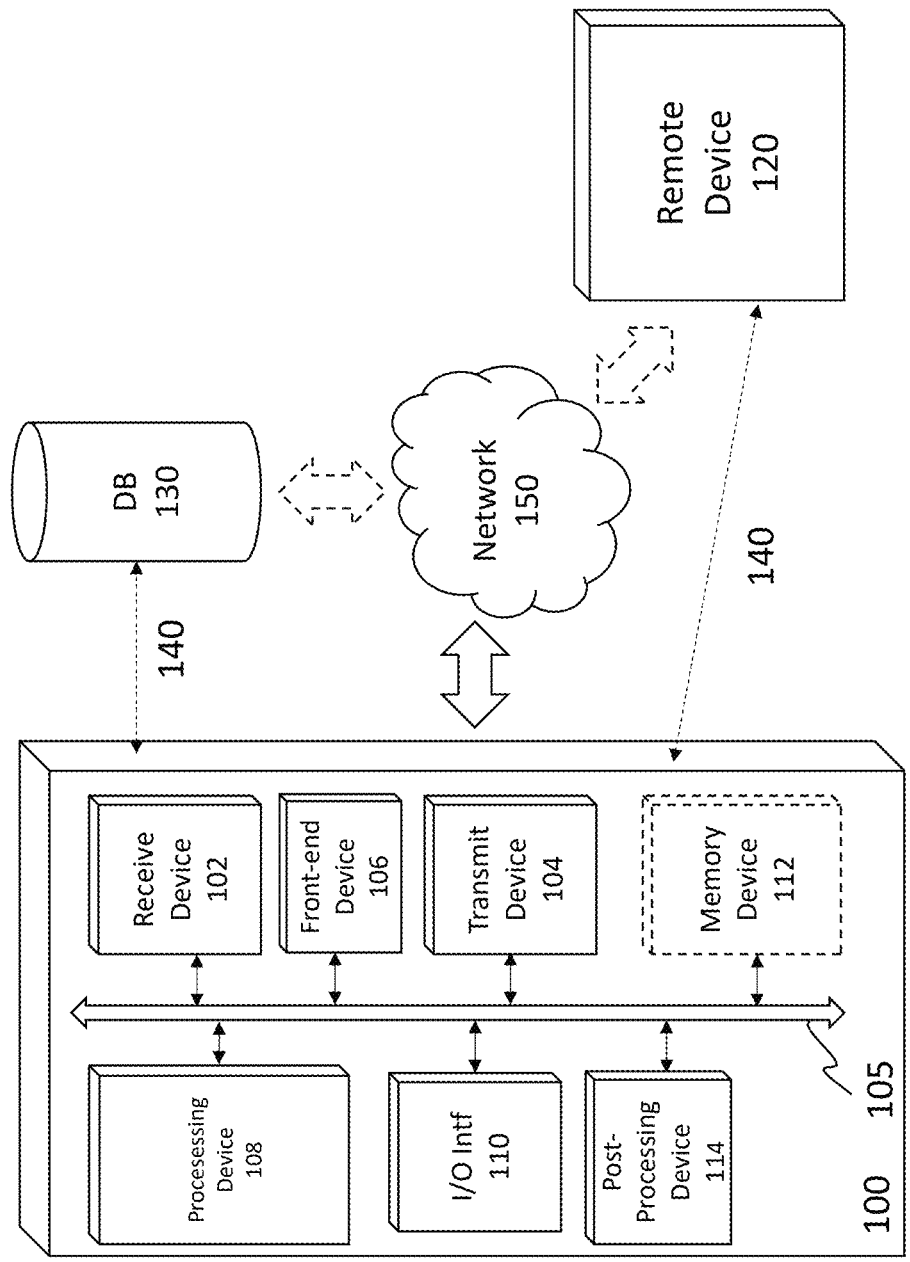
FIG. 1 illustrates a steganography purification system in accordance with an exemplary embodiment of the present disclosure.

FIG. 1 illustrates a steganography purification system in accordance with an exemplary embodiment of the present disclosure.

As shown in FIG. 1, the steganography purifying system 100 can include a receiving device 102, a transmitting device 104, a front-end device 106, a processing device 108, an Input/Output (I/O) interface 110, a memory device 112, and a post-processing device 114. The receiving device 102 can include a combination of hardware and software components and be configured to receive digital from a remote computing device 120, such as a friendly or adversarial computing device. According to an exemplary embodiment, digital data or a digital dataset or data file can be received direct from the remote computing device 120. According to another exemplary embodiment, the digital data can be embedded and/or formatted in a digital signal associated with an application program interface (e.g., email), music platform, social media platform, etc. The receiving device 102 can be connected to the remote computing device 120 via a peer-to-peer connection 140 or through a network 150.

The peer-to-peer connection 140 can be configured for wireless communication without an intermediate device or access point. The network 150 can be configured for wired or wireless communication, which may include a local area network (LAN), a wide area network (WAN), a wireless network (e.g., Wi-Fi), a mobile communication network, a satellite network, the Internet, fiber optic cable, coaxial cable, infrared, radio frequency (RF), another suitable communication medium as desired, or any combination thereof.

The receiving device 102 can include a hardware component such as an antenna, a network interface (e.g., an Ethernet card), a communications port, a PCMCIA slot and card, or any other suitable component or device as desired for effecting communication with the remote computing device 120, a database 130 for storing digital data, and/or the network 150. The receiving device 102 can be encoded with software or program code for receiving digital data according to one or more communication protocols and data formats. For example, the digital data can include an image data (e.g., dataset, or data file) and/or an audio data (e.g., dataset, or data file). The receiving device 102 can be configured to process and/or format the received data signals and/or data packets which include digital data for steganalysis. For example, the receiving device 102 can be configured to identify parts of the received data via a header and parse the data signal and/or data packet into small frames (e.g., bits, bytes, words) or segments for further processing in the one or more processing devices 106. The receiving device 102 can be configured to feed the received digital data to the at least one processing device 106.

The receiving device 102 can include a front-end device 106 according to the type of digital data received. For example, the front-end device 106 can be configured to determine whether the digital data includes image data and/or audio data. The image data can be processed according to whether the images are still images (small images) or video images. The front-end device 106 can be configured to parse a received video image into a plurality of image frames and feed each image frame to the processing device 108 as digital data. According to an exemplary embodiment, the front-end device 106 can be configured to reshape a vector of audio data (e.g., dataset or data file) into a matrix format and feed the matrix to the at least one processor 108 as the digital data. For example, the front-end device 106 can be configured to parse the audio vector into a plurality of segments or pieces and recombine the pieces into a matrix format. It should be understood that the front-end device 106 can be integrated into the receiving device 102, the processing device 108, or be arranged as a wholly separate component, such as in a processor configured to execute or have access to software or program code to perform the above-described operations.

The processing device 108 is configured to generate a purified image based on the digital data received from the receiving device 102. According to exemplary embodiments of the present disclosure, the processing device 108 can include one or more hardware processors can be designed as a special purpose or a general purpose processing device configured to execute program code or software for performing the exemplary functions and/or features disclosed herein. The one or more hardware processors can comprise a microprocessor, central processing unit, microcomputer, programmable logic unit, or any other suitable processing devices as desired. The processing device 108 can be connected to a communications infrastructure 105 including a bus, message queue, network, or multi-core message-passing scheme, for communicating with other components of the computing device 100, such as the receiving device 102, the transmitting device 104, and an I/O interface 110.

Figure 2:
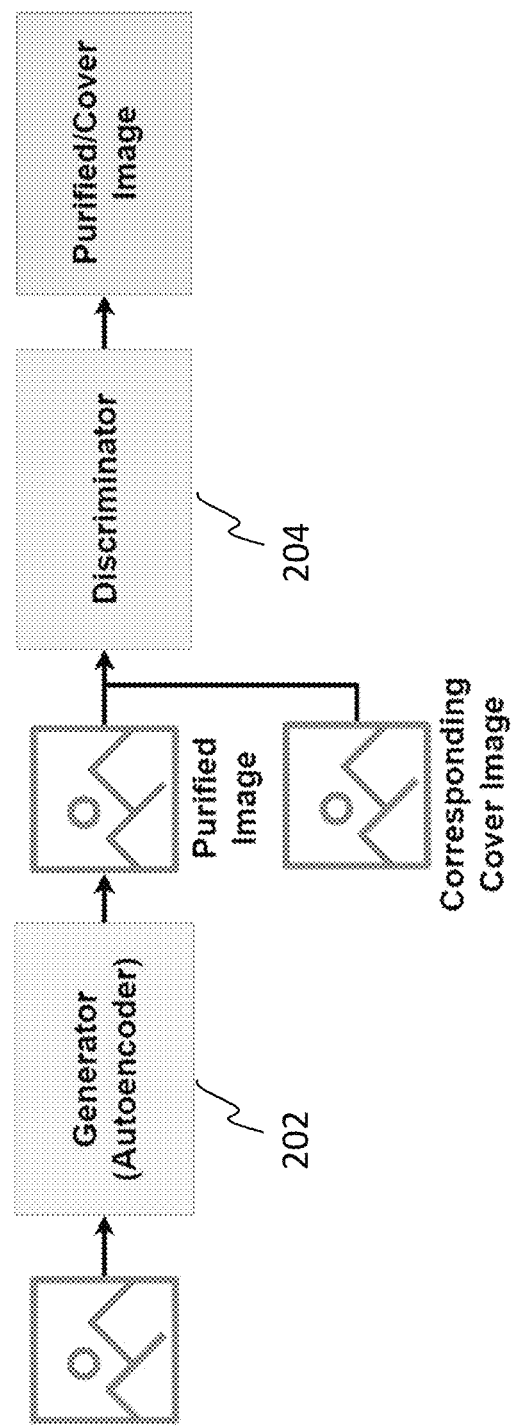
FIG. 2 illustrates a steganography purification model of the processing device in accordance with an exemplary embodiment of the present disclosure.

As shown in FIG. 2, the processing device 108 can be configured to access a neural network architecture comprised of a steganography purifier model 200 having a generator 202 and a discriminator 204. The generator 202 can be configured as a neural network having a plurality of layers for processing individual elements of the digital data received from the receiving device 102. The individual elements of the digital data including pixels representing image data and samples representing audio data. The discriminator 204 can include a plurality of neural network layers configured to compare a purified image output from the generator 202 with a corresponding cover image. The discriminator 204 is activated only during a training mode, such that only the generator 202 is used during a mode for steganography purification.

Figure 3A:
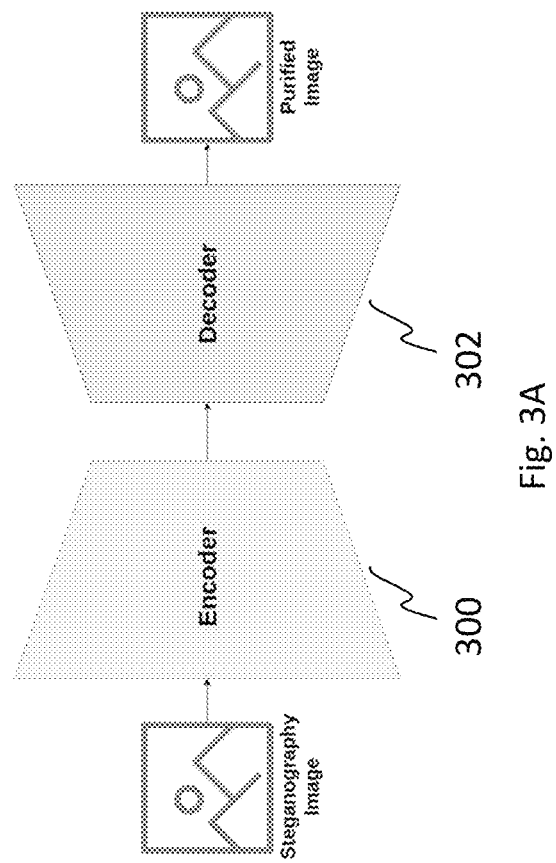
FIGS. 3A-3E illustrate flow diagrams of a generator in accordance with an exemplary embodiment of the present disclosure.
Figure 3B:
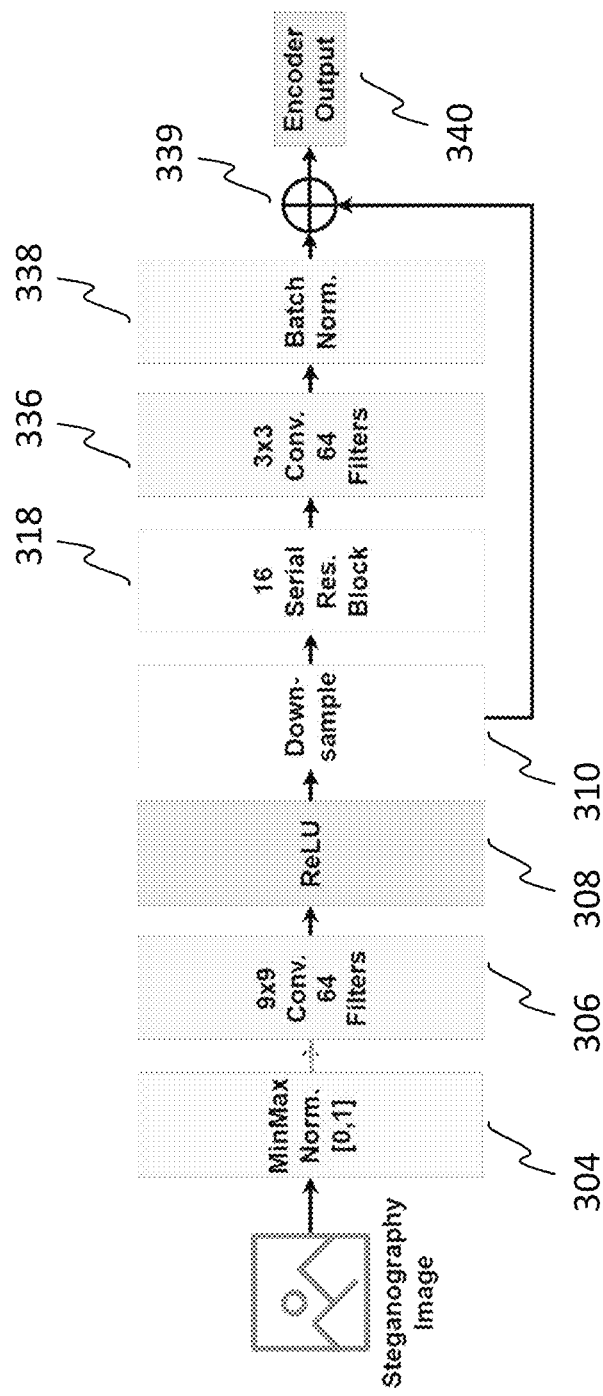
Figure 3C:
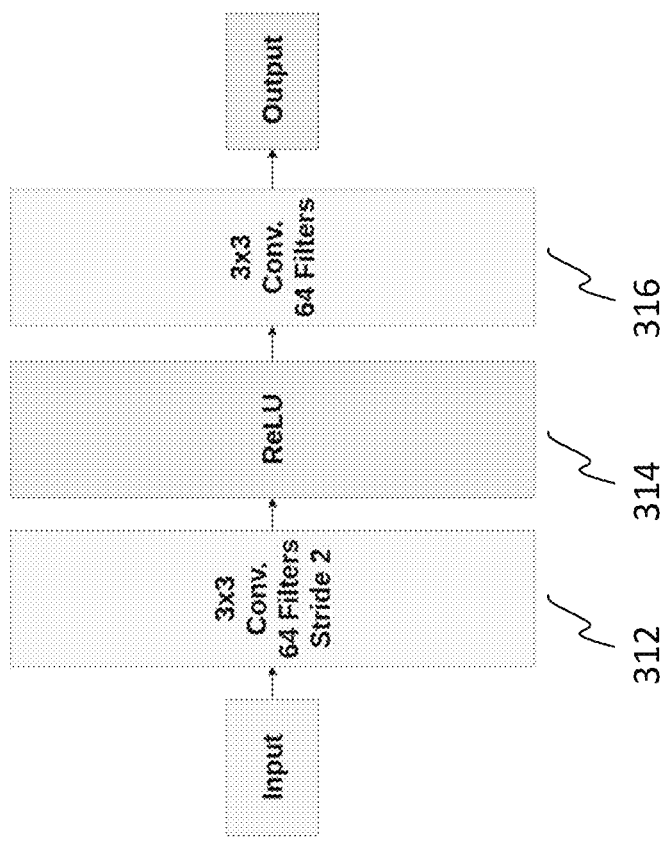

FIGS. 3A-3E illustrate flow diagrams of a generator in accordance with an exemplary embodiment of the present disclosure. As shown in FIG. 3A, the generator 202 can include an encoder 300 and a decoder 302. As shown in FIG. 3B, the plurality of neural network layers encompassing the encoder 300 can include a normalization layer 304 configured to scale a magnitude of individual elements of the digital data from a first (e.g., original) value range to a second value range. For example, the original value range of individual pixel elements of image data (e.g., dataset or data file) can be scaled from a value of 0 to 255 to a value of 0 to 1. The scaled digital data can be fed to a two-dimensional (2D) convolutional layer 306 arranged with a rectified linear unit (ReLU) 308. The convolutional layer 306 includes a kernel of specified size and a plurality of filters can be configured to filter the scaled digital file and a rectified linear unit (ReLU) 308 can be configured to generate an output indicating the presence of a feature in the portion or area of the digital data analyzed through the kernel of the convolutional layer. According to an exemplary embodiment of the disclosure, the convolutional layer 306 can include a 9×9 kernel used with 64 filters. However, it should be apparent to one of skill in the art that a kernel of any specified size and any number filters can be used according to the desired results. The output of the ReLU 308 can be fed to a downsampling layer 310 configured to downsample the feature(s) of the digital data output by the convolutional layer 306 by a specified factor. The output of the downsampling layer 310 is fed to a residual block 318, a convolutional layer 336, and a batch normalization layer 338, which are discussed in further detail below. As shown in FIG. 3C, the downsampling layer 310 can include a plurality of sub-layers encompassing at least a pair of two-dimensional convolutional layers 312, 316 with a second ReLU layer 314 provided therebetween. According to an exemplary embodiment, the convolutional layer 312 can be configured with a stride of 2 to realize a downsampling factor of 2. The downsampling operation removes steganography data embedded in the digital data and produces a purified version of the digital data.

According to an exemplary embodiment, the front-end processing for audio data could be performed within the generator 202 rather than a front-end device 106, by replacing the 2-D convolutional layer 306 with a one-dimensional convolutional layer such that processing of the audio file could be performed without converting the audio data to a matrix format.

Figure 3D:
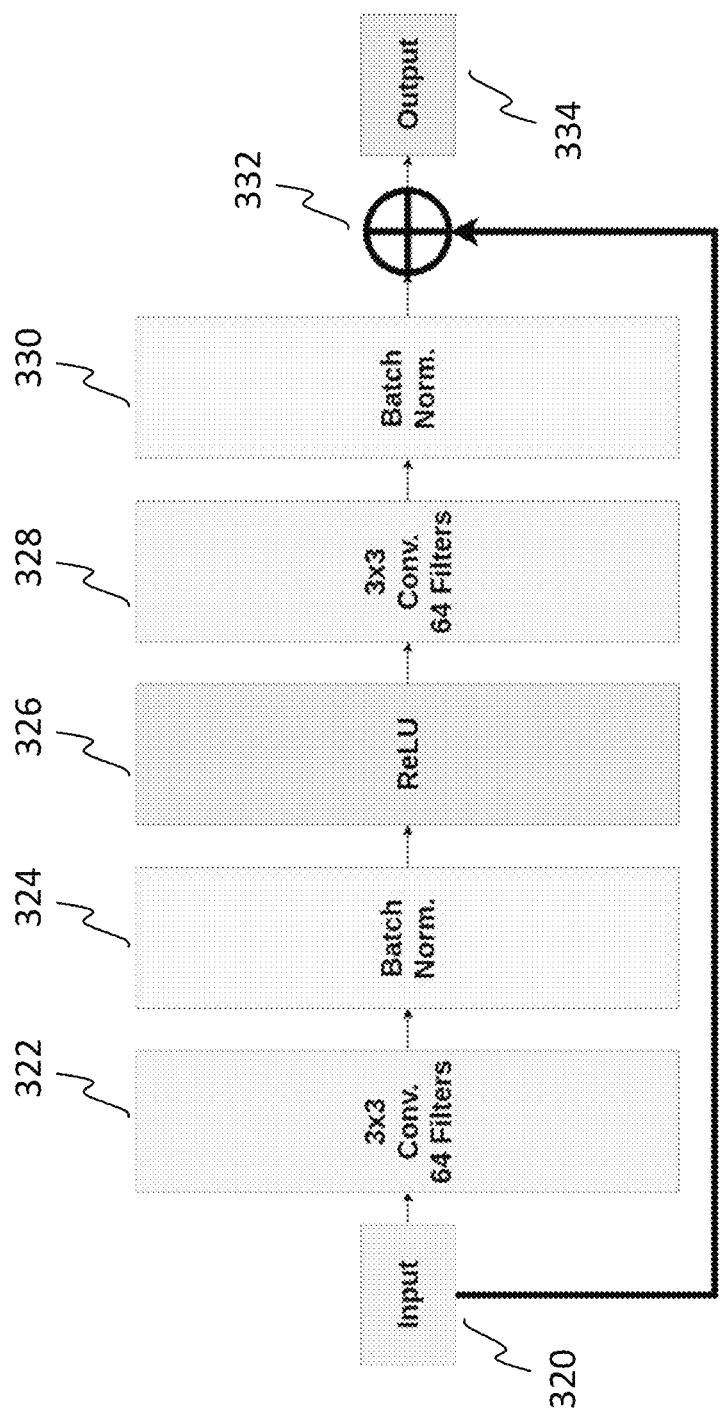

As shown in FIG. 3B, the output of the downsampling layer 310 can be fed to a residual block 318 having 16 residual blocks. FIG. 3D illustrates an exemplary residual block in accordance with an exemplary embodiment of the present disclosure. As shown in FIG. 3D, the residual block 318 can include an input layer 320, which feeds the output of the downsampling layer 310 to a convolutional layer 322 having a specified kernel size in combination with a specified number of filters. The output of the convolutional layer 322 is fed to a batch normalization layer 324 followed by a ReLU layer 326, a convolutional layer 328 of a specified kernel size in combination with a specified number of filters, and another batch normalization layer 330 to standardize the output of the convolutional layer 328. The output of the batch normalization layer 330 is summed 332 with an output from the input layer 320. The output of the summer 332 is fed to an output layer 334. The value at the output layer 332 of the residual block 318 is fed to a two-dimensional (2D) convolutional layer 336 followed by a batch normalization layer 338 to standardize the output of the 2D convolutional layer 336. The output of the batch normalization layer 338 is summed 339 with the original output of the downsampling layer 310 to form an encoder output 340 containing one or more purified features of the received (e.g., original) digital data. According to an exemplary embodiment, each convolutional layer 312, 316, 322, 328, 336 can have a kernel size of 3×3 in combination with 64 filters. It should be apparent to one of skill in the art that any specified kernel size and number of filters can be used to achieve the desired results.

Figure 3E:
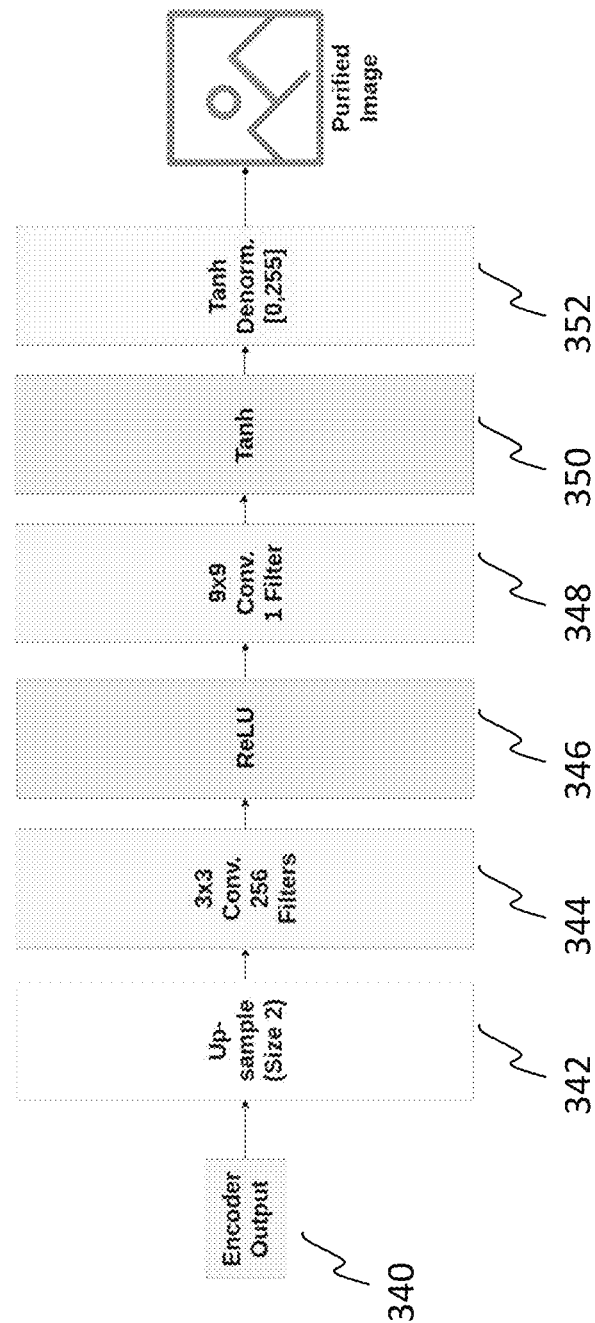

FIG. 3E illustrates a plurality of neural network layers included in the decoder 302. As shown in FIG. 3E, the encoder output 340 is fed to an upsampling layer 342, which interpolates data between data elements of the encoder output 340. The upsampling layer 342 increases the shape of the encoder output 340 to the size of the original digital data received at the input of the encoder 300. The output of the upsampling layer 342 is fed to a two-dimensional convolutional layer 344 with a specified kernel size and specified number of filters followed by a ReLU activation layer 346. The output of the ReLU activation layer 346 is fed to another two-cushioning dimensional convolutional layer 348 having a specified kernel size and number of filters. The convolutional layers 344, 348 can have a kernel of any size in combination with a number of filters to achieve a desired result. In accordance with an exemplary embodiment, the convolutional layer 344 has a 3×3 kernel and 256 filters, and the convolutional layer 348 has a 9×9 kernel with 1 filter. The output of the second convolutional layer 348 is fed to a Tanh activation layer 350, 352 which is configured to denormalize the individual elements of the digital data back to the original value range. For example, the magnitude of each pixel value is rescaled to have a value which falls within the original value range (0 to 255) of the digital data received at the receiving device 102. The output of the Tanh activation layer 350, 352 is a purified version of the original digital data received at the receiving device 102.

The post-processing device 114 can be configured to perform any suitable processing on the purified digital data output from the decoder 302, to convert the purified digital data back into its original format. For example, if the original digital data received at the receiving device 102 includes the video images, the post-processing device can reformat and order the image frames output from the decoder 302 in order to reconstruct the original video data of the original digital data. In another example, the post-processing device 114 can be configured to reconstruct audio data included in the original digital data by reshaping the matrix of the purified digital data output from the decoder 302 into an audio vector. It should be understood that the post-processing device 114 can be integrated into the processing device 108 or be provided in a wholly separate component, such as in a processor configured to execute software or program code to perform the above-described operations.

Figure 4A:
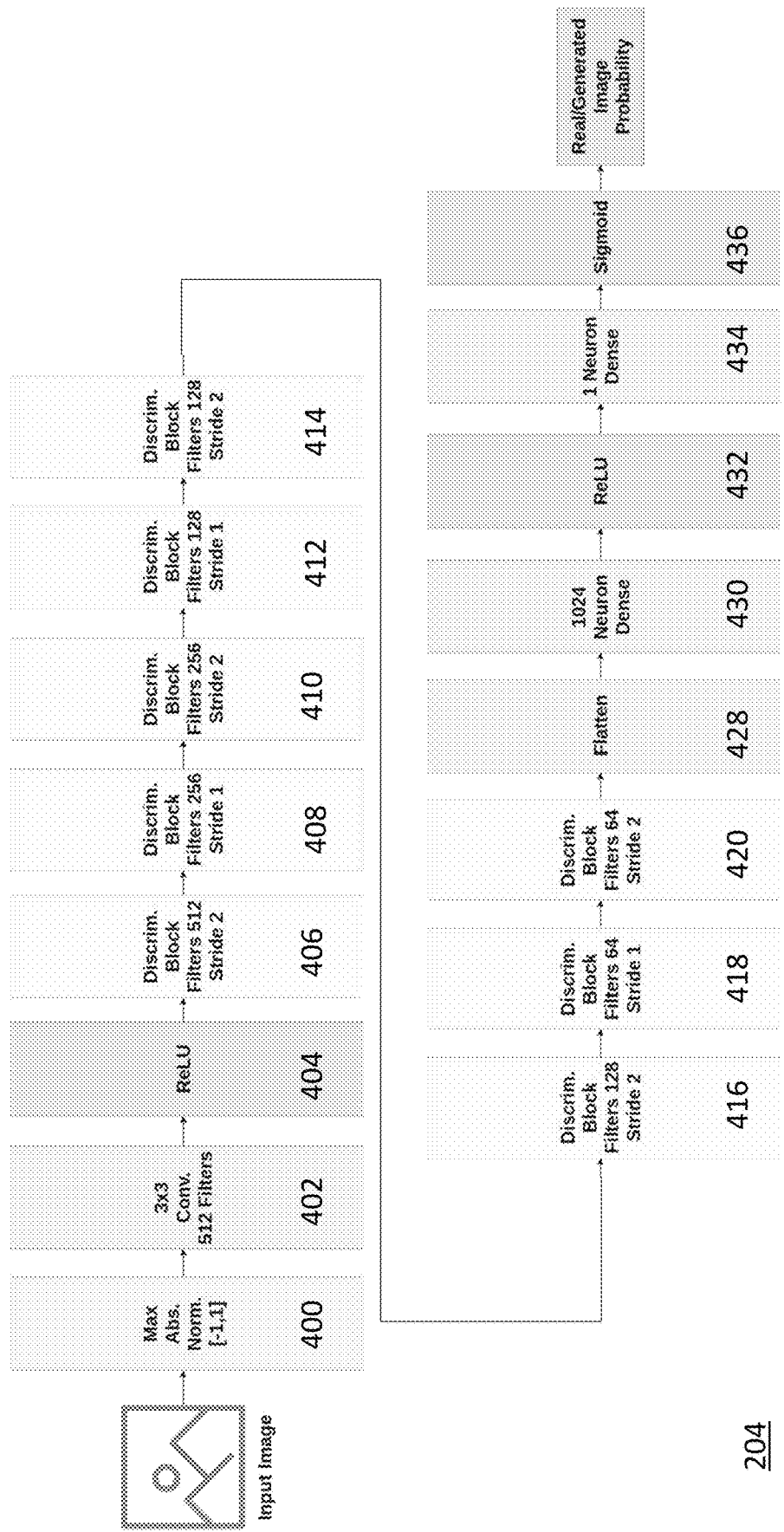
FIGS. 4A and 4B illustrates a discriminator of the processing device in accordance with an exemplary embodiment of the present disclosure.
Figure 4B:
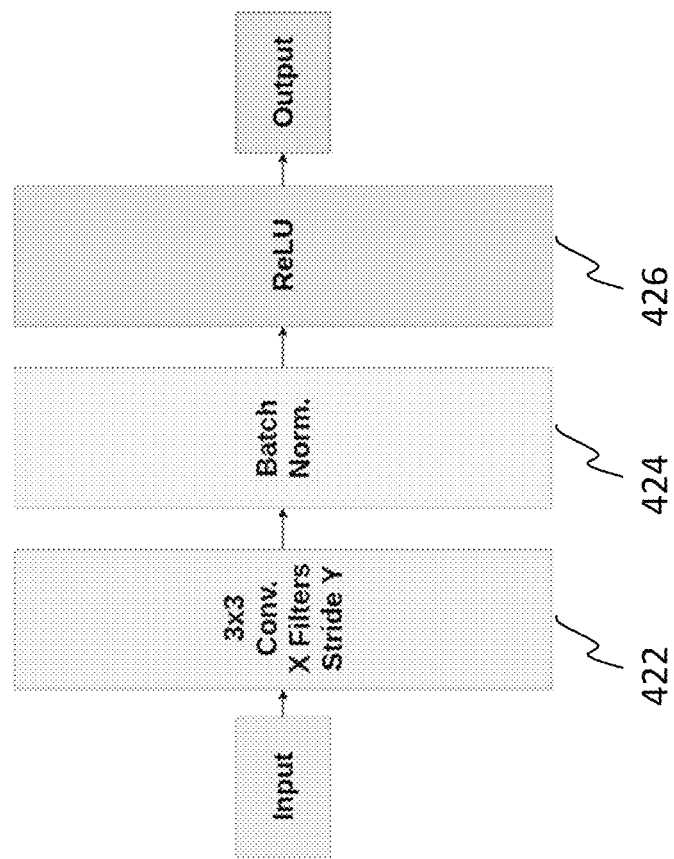

FIGS. 4A and 4B illustrates a discriminator of the processing device in accordance with an exemplary embodiment of the present disclosure. The discriminator 204 can be activated in the processing device 108 based on whether the training mode of the steganography purification model is to be executed. In the training mode, the discriminator 204 compares the purified image output from the generator 202 to a cover image of the original steganographic image. According to an exemplary embodiment, the generator 202 and discriminator 204 can be accessed or executed in different processing devices 108 such that upon completion of the training process the specific processing device 108 configured to execute or having access to the generator 202 can be deployed in the specified application.

As shown in FIG. 4A, the input layer of the discriminator 204 is a normalization layer 400 which scales the input images from a value of 0 to 1 (0, 1) to a value in the range of −1 to 1. The data input to the normalization layer 400 includes both the purified image and the cover image as shown in FIG. 2. The output of the normalization layer 400 is fed to a convolutional layer 402 having a specified kernel size (e.g., 3×3) and a specified number (e.g., 512) of filters. The output of the convolutional layer 402 is fed to a ReLU layer 404. The output of the ReLU layer 404 is fed to a series of discriminator blocks 406 to 420. As shown in FIG. 4B, each discriminator block includes a convolutional layer 422 configured to have a specified kernel size (e.g., 3×3), a specified number of filters X, and a specified stride Y. The output of the convolutional layer 422 is fed to a batch normalization layer 424 followed by a ReLU layer 426. The series of discriminator blocks 406 to 420 are configured to reduce the number of model parameters. This result is achieved by decreasing the number of filters in the convolutional layer 422 for each subsequent discriminator block. For example, the discriminator blocks 406 to 420 can include an increasing number of 3×3 filter kernels, which increase by a factor of 2 from 64 to 512. Each of the discriminator blocks 406 to 420 has a specified stride value used to reduce the image resolution each time the number of features in a preceding convolutional layer is doubled. The output of discriminator block 420 is fed to a series of layers including a flattening layer 428, a 1024 dense layer 430, a ReLU layer 432, a 1 neuron dense layer 434, and a sigmoid layer 436. As a result of the last group of layers, the discriminator outputs a probability that the purified image matches the cover image.

See [19] "Deep residual learning for image recognition" which details the ResNet neural network architecture; [26] "Rectified linear units improve restricted Boltzmann machines" which details the ReLU activation function. The entire content of these is incorporated by reference.

Figure 5:
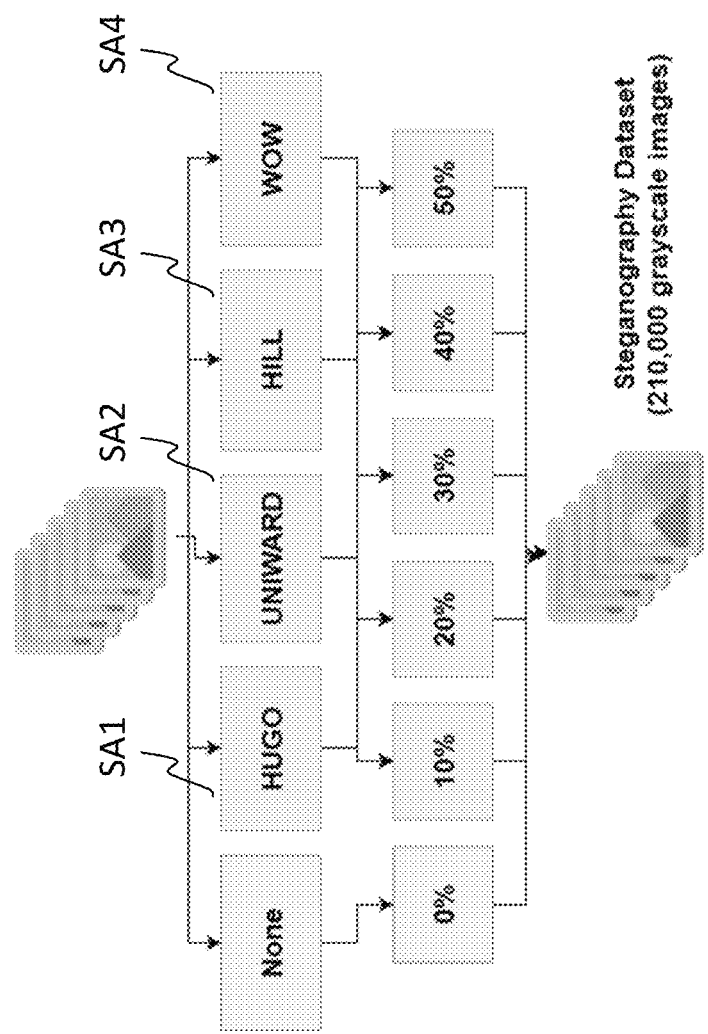
FIG. 5 illustrates a flow diagram of generating image data to train the generator and discriminator in accordance with an exemplary embodiment of the present disclosure.

During the training mode, steganographic images can be input to the encoder 300 of the generator 202. FIG. 5 illustrates a flow diagram of generating image data for training the generator and discriminator in accordance with an exemplary embodiment of the present disclosure. See [27] "Adam: A method for stochastic optimization" which describes an optimization algorithm for training the neural networks. The entire content of which is incorporated by reference.

As shown in FIG. 5, an image dataset of a plurality of digital images is used to create the reference image dataset and the other image datasets encoded with steganography according to one of a plurality of steganography algorithms. The image dataset can include a plurality of digital images being different in one or more of an image format, image content, image size, and color space. The digital images in the base image dataset also serve as reference (e.g., cover) images in that they do not include steganography. The image dataset can be generated by encoding base images with steganography according to one or more steganography algorithms. Each image is iteratively input into steganography analyzer SA1 to SA4, where each analyzer is configured to execute a specified steganography algorithm at a specified embedding rate. The steganography algorithms can include, for example, Highly Undetectable Steganography (HUGO), steganography utilizing a universal distortion function (S-UNIWARD), steganography based on a hill cipher technique (HILL), steganography based on wavelet obtained weights (WOW) or any other suitable steganography algorithm as desired. Each image of the base image dataset is iteratively input with data embedded at different embedding rates. According to an exemplary embodiment, the selected embedding rates can be any one or more embedding rates selected from 0% to 100%, and in an exemplary embodiment can include rates of 10%, 20%, 30%, 40%, and 50%, where 10% is the most difficult embedded data to detect. It should be understood that while FIG. 5 illustrates the use of five (5) steganography analyzers, the number of steganography analyzers is not limited to the ones shown or the number of possible steganography analyzers which can be used to train the system 100. See [20] "Break our steganographic system": the ins and outs of organizing BOSS, which details the BOSSBase dataset used to train the models described herein. See [25] http://dde.binghamton.edu/download/stego_algorithms/, which describes known implementations of steganographic algorithms (HILL, HUGO, WOW, S-UNIWARD). See [21] Using high-dimensional image models to perform highly undetectable steganography," which explains the HUGO steganography algorithm; [22] "A new cost function for spatial image steganography" which explains the S-UNIWARD steganography algorithm; [23] "Universal distortion function for steganography in an arbitrary domain" which explains the S-UNIWARD steganography algorithm; [24] "Designing steganographic distortion using directional filters," which explains the WOW steganography algorithm. The entire content of each reference is incorporated by reference.

The plurality of steganographic images are fed to the encoder 302 of the generator 202. The encoder generates a purified version of each steganographic image, by scaling down a magnitude of the individual elements of the image and filtering scaled elements to remove the steganography. As the image passes through the generator 202, weights of the purified image are fed to the decoder 304 which decodes the image by rescaling the magnitude of the individual elements to return the image back to its original size and interpolating new data elements between adjacent data elements of the rescaled image to form a purified image. The decoding includes an interpolation of individual elements of the image replace those elements which were removed by the encoder 302. The purified image is fed to the discriminator 204, which compares the purified image to a corresponding reference or cover image of the original steganographic image using a mean square error (MSE) loss function. According to an exemplary embodiment other loss functions, such as, mean absolute error (MAE) and root mean squared error (RMSE) can be used as applicable to achieve the desired results.

Figure 6:
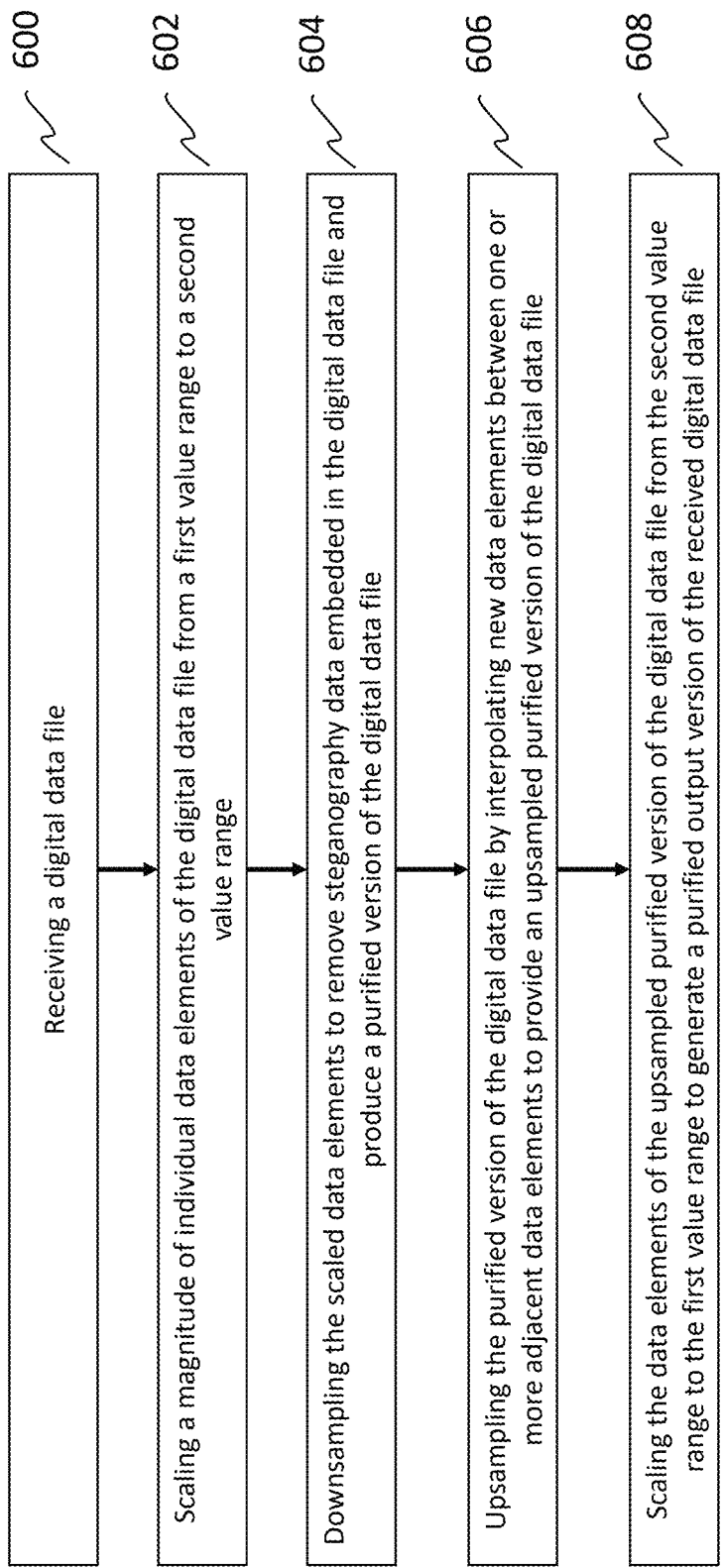
FIG. 6 illustrates a method for removing steganography from digital data according to an exemplary embodiment of the present disclosure.

FIG. 6 illustrates a method for removing steganography from digital data according to an exemplary embodiment of the present disclosure.

As shown in FIG. 6, digital data encoded with steganography is input to the receiving device 102 (Step 600). The receiving device 102 determines whether the digital data includes image data or audio data such that further processing of the data by the front-end device may be necessary. For example, if the digital data includes video image data, the front-end device 106 parses the video data into a plurality of still frames. In another example, the digital data includes audio data. The audio data can be initially formatted as a vector of values. The front-end device 106 processes the audio data by reshaping the vector into a matrix of values. The processing device 108 receives the digital data from the front-end device into the generator 202. The encoder 300 of the generator 202 scales the magnitude of individual elements of the digital data from a first (e.g., original) value range to a second value range to reduce the size of the dataset or data file (Step 602). For example, for image data the magnitude of each pixel can be scaled from a value between 0 and 255 to a value between 0 and 1. The encoder 300 downsamples the scaled digital data to generate a purified version of the dataset or data file (Step 604). The purified version of the data is fed to the decoder 302 of the generator 202, where it is upsampled to resize the purified data to its original size observed at the input of the generator 202 (Step 606). The upsampling can include interpolating new data elements between the data elements of the enlarged dataset or data file to produce an upsampled purified version. The resized dataset or data file is then rescaled such that the magnitude of the individual elements in the upsampled purified version of the image data are converted from the second value range to the first (e.g., original) value range of the received digital data (Step 608). For example, the decoder scales the magnitude value of each individual element of the dataset or data file from a value between 0 and 1 to a value between 0 and 255. The rescaled image is output as the purified digital data. The decoder 302 feeds the purified digital data to the post-processing device 214. If the digital data input at the receiving device 102 included video or audio data, the post-processing device 214 reassembles the still video frames according to the original format and sequence of the received video data, and/or reshapes the matrix of the audio values into a vector according to the received audio data. See [34] "Voxceleb: a large-scale speaker identification dataset" which describes an audio dataset used to embed malware payloads using the LSB steganography algorithm; [35] "On the theory of filter amplifiers" which details the butterworth filter which used to filter the audio files after steganography removal; and [36] "Elements of statistical analysis" which details the hanning window used with the butterworth filter in [35]. The entire content of which is hereby incorporated by reference.

Figure 7:
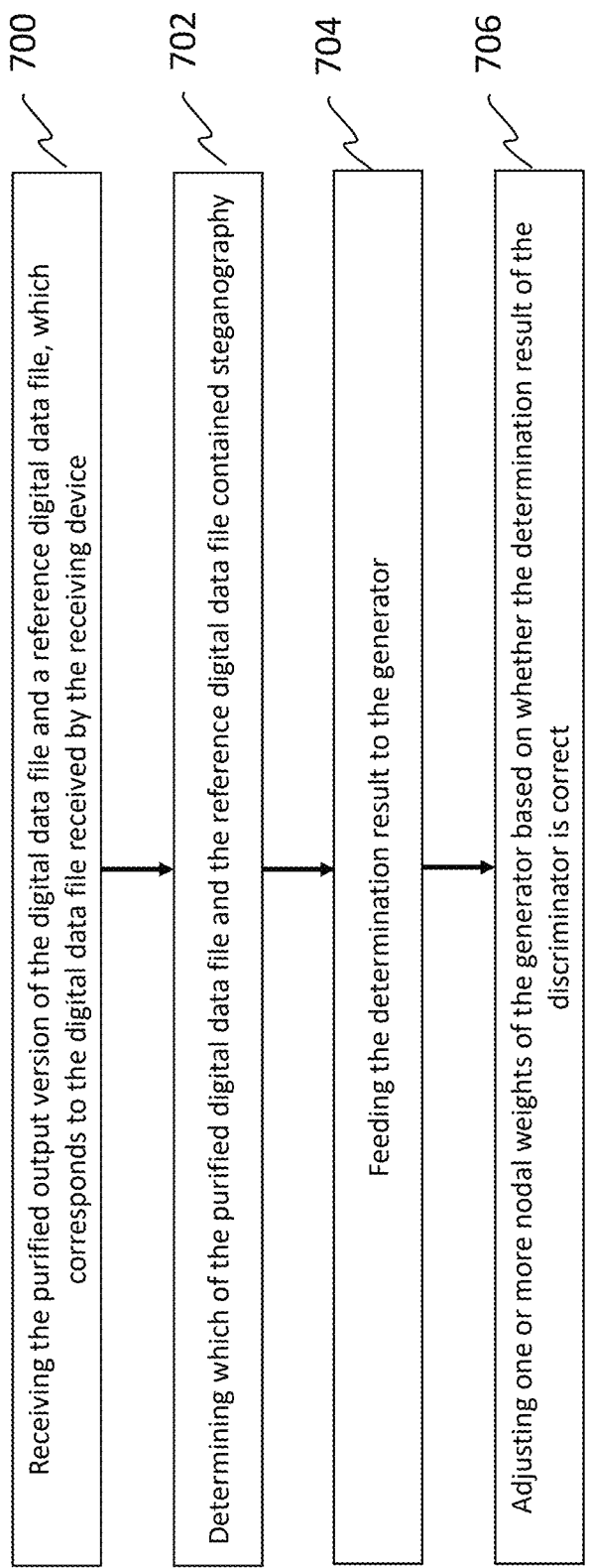
FIG. 7 illustrates a method for training a processor to execute a steganography purification model according to an exemplary embodiment of the present disclosure.

FIG. 7 illustrates a method for training a processor configured to execute or access a steganography purification model according to an exemplary embodiment of the present disclosure. The system configured with components or devices for executing the method has the receiving device 104 and the processing device 108 configured to access a steganography purifier model having at least a generator 202 for generating purified digital data and a discriminator 204 for distinguishing between the purified digital data and cover data during a training process. During the training process, the system performs the method of FIG. 6 for generating a purified image and performs the additional steps of distinguishing the purified image from the corresponding cover image as performed by the discriminator 204. See [4] Generative Adversarial Nets which describes a training framework used to optimize the neural network. The framework uses a $2^{nd}$ neural network to "critique" the purifier neural network's output. See [18] Photo-realistic single image super-resolution using a generative adversarial network, that uses GANs to get optimal image quality (e.g., image super resolution). The entire content of these references is incorporated by reference.

The purified output image is fed to the discriminator along with a cover image corresponding to the related steganographic image (Step 700). The discriminator 204 attempts to correctly determine which input image is the cover image and which is the purified image (Step 702). The determination result of the discriminator 204 is fed to the generator 202 (Step 704). One or more nodal weights of the generator 202 are adjusted based on whether the determination result of the discriminator is correct (Step 706). The nodal weights of the generator 202 are adjusted so that subsequent purified digital data has less steganographic content than previous purified digital data. During the training process, the generator 202 and the discriminator 204 operate according to a generative adversarial network (GAN). For example, the generator 202 is configured to generate a purified image with the objective of having the discriminator 204 select the purified image as the cover image or increase the selection error rate of the discriminator 204. The generator 202 is trained based on whether it successfully deceives the discriminator 204. That is, as the success rate of deception is higher, a higher quality purified images is being generated. According to an exemplary embodiment, the GAN framework of the generator 202 and discriminator 204 can be trained for 5 epochs to fine tune the generator to produce more accurately purified images with high frequency detail of the original cover image. It should be understood, however, that any number of epochs can be used during the training mode as desired.

Turning back to FIG. 1, the transmitting device 104 can be configured to receive the purified digital data from the processing device 108 via the communication infrastructure 105. The transmitting device 104 can assemble the data into a data signal and/or data packets according to the specified communication protocol and data format for communication over the network 150 to another computing device. The transmitting device 104 can include any one or more of hardware and software components for generating and communicating the data signal via a direct wired or wireless link to a peripheral or remote computing device 120. The transmitting device 104 can be configured to transmit information according to one or more communication protocols and data formats as discussed above in connection with the receiving unit 102.

According to an exemplary embodiment, the I/O interface 110 can also be configured to receive the probability data from the processing device 108 via the communication infrastructure 105. The I/O interface 110 can be configured to convert the probability data into a format suitable for output on one or more output devices 130. According to an exemplary embodiment, the output device 130 can be implemented as a display device, printer, speaker, or any suitable output format as desired.

To compare the quality of the resulting purified images, the following metrics were calculated between the purified images and their corresponding steganographic counterpart images: Mean Squared Error (MSE), Peak Signal-to-Noise Ratio (PSNR), Structural Similarity Index (SSIM) [28], and Universal Quality Index (UQI) [29]. The MSE and PSNR metrics are point-wise measurements of error while the SSIM and UQI metrics were developed to specifically assess image quality. To provide a quantitative measurement of the model's distortion of the pixels to destroy steganographic content, a bit error ratio (BER) metric, which can be summarized as the number of bits in the image that have changed after purification, normalized by the total number of bits in the image.

Figure 8:
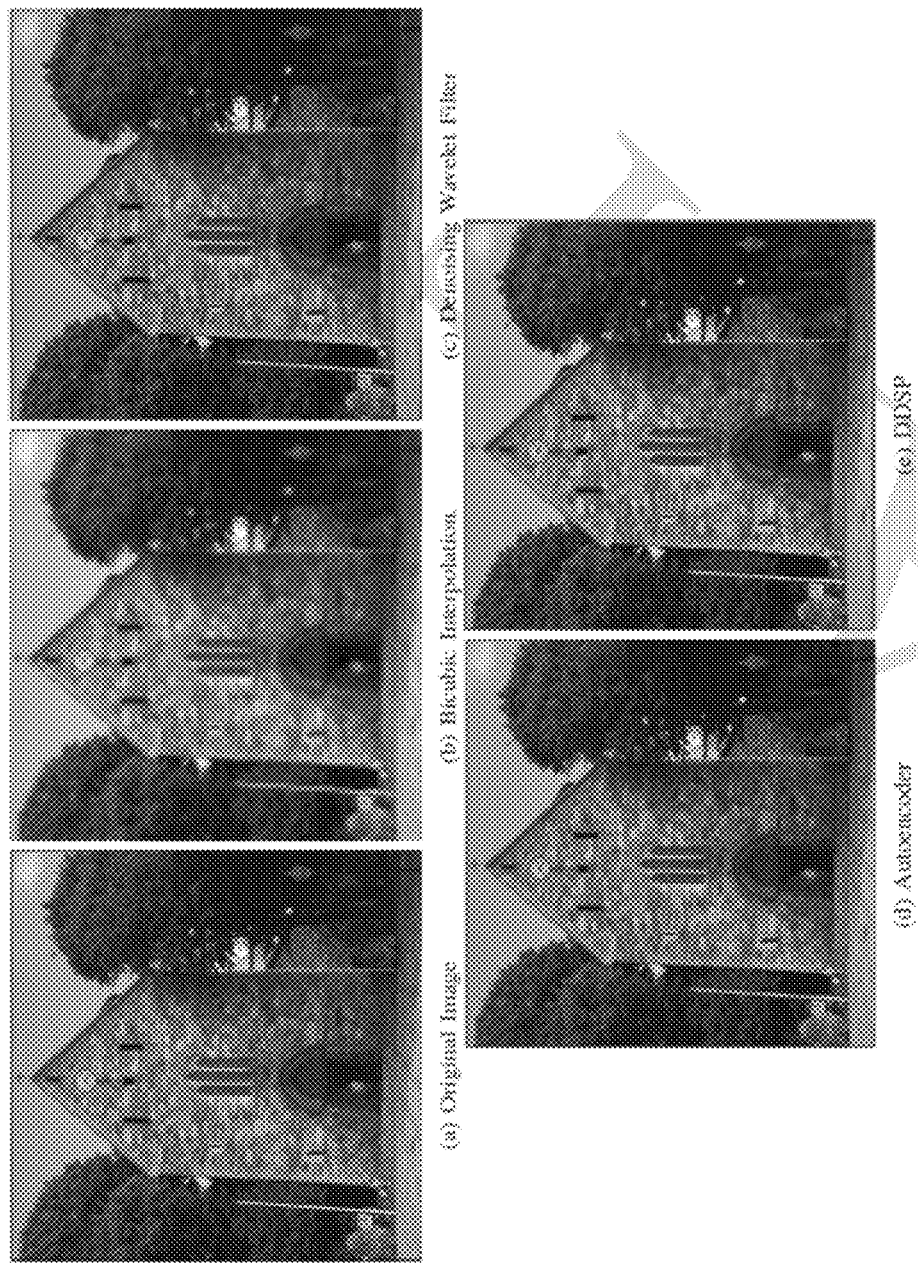
FIGS. 8A-8E illustrate examples of scrubbed images using various known steganography purification models in comparison with the steganography purification model of FIG. 2.

The output results of the disclosed steganography purifier were baselined against several steganography removal or obfuscation techniques. The first method simply employs bicubic interpolation to downsize an original image of FIG. 8A by a scale factor of 2 and then resize the image back to its original size. As seen in FIG. 8B, the purified image using bicubic interpolation is blurry and does not perform well with respect to maintaining high perceptual image quality. The next baseline method consists of denoising filters using Daubechies 1 (db 1) wavelets [30] and BayesShrink thresholding [31].

An example of the resulting denoised image can be seen in FIG. 8C. It is notable that the wavelet denoising method is more visually capable of maintaining adequate image quality in comparison to the bicubic resizing method. The final baseline method compared to the disclosed steganography purifier (DDSP) uses the pretrained autoencoder prior to GAN fine tuning as the purifier. As seen in FIG. 8D, the autoencoder does an adequate job in maintaining image quality while purifying the image. Finally, the resulting purified image from the DDSP can be seen in FIG. 8E. The DDSP and the autoencoder's purified images have the best visual image quality, with the wavelet filtered image having a slightly lower image quality. Not only does the DDSP maintain very high perceptual image quality, it is quantitatively image purifier based on image quality metrics. As seen in Table I, the images purified using DDSP resulted in the greatest performance with respect to the BER, MSE, PSNR, SSIM and UQI metrics in comparison to all baselined methods. Since the DDSP model resulted in the highest BER at 82%, it changed the highest number of bits in the image, effectively obfuscating the most amount of steganographic content. Even though the DDSP model changed the highest number of bits within each image, it produced outputs with the highest quality as verified by the PSNR, SSIM, and UQI metrics, indicating that of the methods listed in Table I below, DDSP is the preferred method for steganography removal.

TABLE I

Testing Results on the BossBase Dataset

| Model | BER | MSE | PSNR | SSIM | UQI |
|---|---|---|---|---|---|
| DDSP | 0.82 | 5.27 | 40.91 | 0.99 | 0.99 |
| AutoEncoder | 0.78 | 5.97 | 40.37 | 0.98 | 0.99 |
| Wavelet Filter | 0.52 | 6942.51 | 9.72 | 0.19 | 0.50 |
| Bicubic Inter. | 0.53 | 6767.35 | 9.82 | 0.22 | 0.51 |

Figure 9:
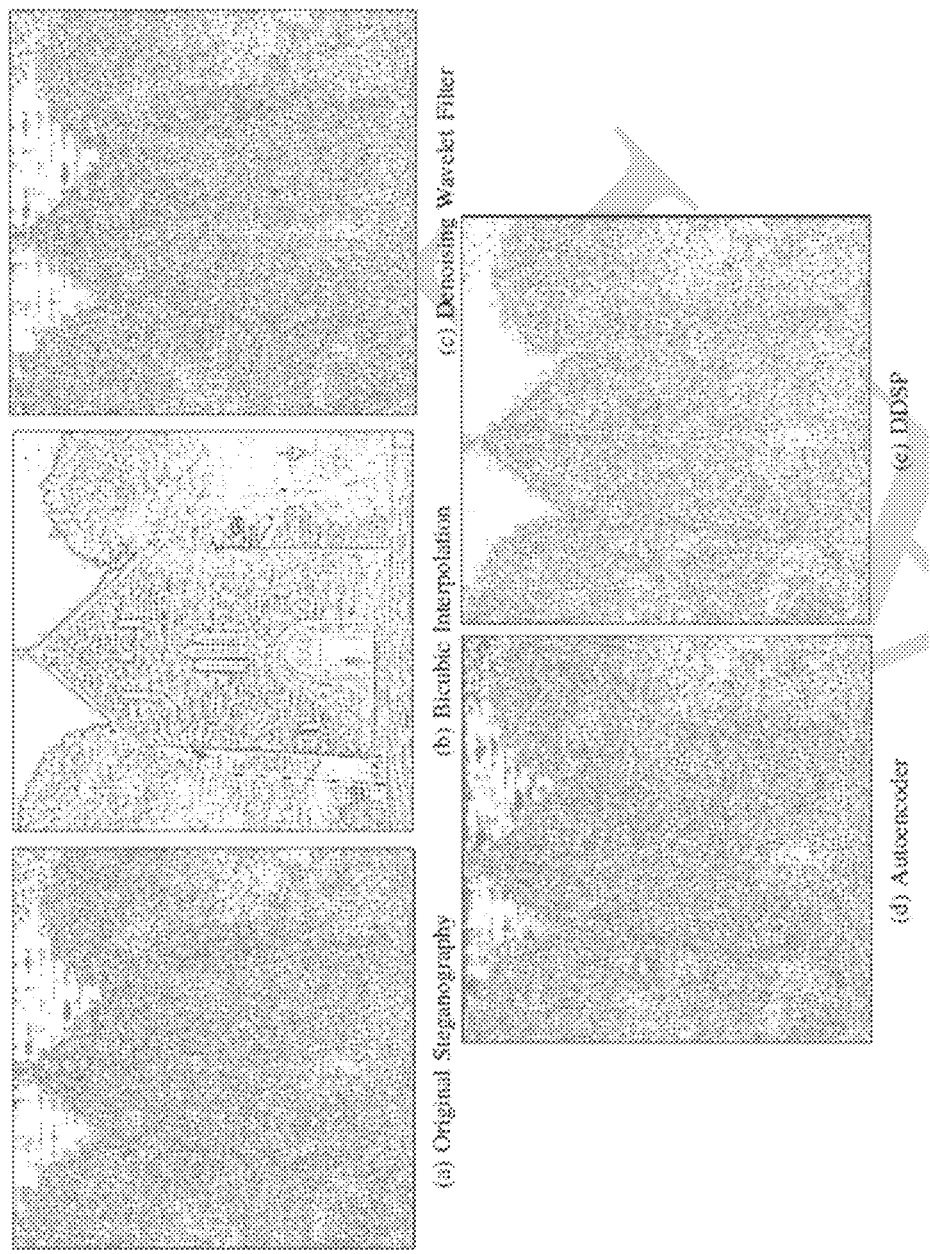
FIGS. 9A-9E illustrate examples of image differencing using various known steganography purification models in comparison with the steganography purification model of FIG. 2.

To provide additional analysis of the different image purification models, the original cover image can be subtracted from corresponding purified images allowing for the visualization of the effects caused by steganography and purification. As seen in FIG. 9A, when the cover image and the corresponding steganographic image are differenced, the resulting image contains a lot of noise. This is expected because the steganography algorithm injects payloads as high frequency noise into the images. The differenced bicubic interpolation purified image, seen in FIG. 9B, removes the majority of noise from the image. However, as discussed in the previous section, the bicubic interpolation method does not maintain good visual quality as it removes original content from the image. As seen in FIGS. 9C and 9D, both the denoising wavelet filter and autoencoder purifier do not remove the noise from the image. Instead, they both appear to inject so much additional noise into the image to obfuscate the steganographic content, that the image can be unusable. This is visually apparent in the noise located in the whitespace near the top building within the image. For both the wavelet filter and autoencoder, this noise is visually increased in comparison to the original steganographic image. Lastly, as seen in FIG. 9E, the DDSP model removes the noise from the image instead of injecting additional noise. This is again apparent in the whitespace near the top of the image. In the DDSP's purified image, almost all the noise has been removed from these areas, effectively learning to optimally remove the steganographic pattern, which we infer makes the DDSP have the highest image quality in comparison to other methods.

Transfer learning can be described as using and applying a model's knowledge gained while training on a certain task to a completely different task. To understand the generalization capability of our model, the DDSP model is tested against the purification of images embedded using an unseen steganography algorithm along with an unseen image format. Additionally, the DDSP can be tested against a purification method of audio files embedded with an unseen steganography algorithm.

To test the generalization of the DDSP model across unseen image steganography algorithms, the purification performance of the BOSSBase dataset in its original PGM file format embedded with steganographic payloads using LSB steganography [32] is recorded. The images can be embedded with malicious payloads generated using Metasploit's MSFvenom payload generator [33], to mimic the realism of an APT hiding malware using image steganography. Without retraining, the LSB steganography images were purified using the various methods. The DDSP model removed the greatest amount of steganography while maintaining the highest image quality. These results can be verified quantitatively by looking at Table II.

TABLE II

Transfer Learning Results on the LSB Dataset

| Model | BER | MSE | PSNR | SSIM | UQI |
|---|---|---|---|---|---|
| DDSP | 0.82 | 5.09 | 41.05 | 0.98 | 0.99 |
| AutoEncoder | 0.78 | 5.63 | 40.62 | 0.98 | 0.99 |
| Wavelet Filter | 0.53 | 6935.08 | 9.72 | 0.19 | 0.50 |
| Bicubic Inter. | 0.53 | 6763.73 | 9.83 | 0.22 | 0.51 |

The audio files were from the VoxCeleb1 dataset [34], which contains over 1000 utterances from over 12000 speakers, however we only utilized their testing dataset. The testing dataset contains 40 speakers, and 4874 utterances. In order to use the DDSP model without retraining for purifying the audio files, the audio files were reshaped from vectors into matrices and then fed into the DDSP model. The output matrices from the DDSP model were then reshaped back to the original vector format to recreate the audio file. After vectorization, a butterworth lowpass filter [35] and a hanning window filter [36] were applied to the audio file to remove the high frequency edge artifacts created when vectorizing the matrices. The models were baselined against a 1-D denoising wavelet filter as well as upsampling the temporal resolution of the audio signal using bicubic interpolation after downsampling by a scale factor of 2.

As seen in Table III, the pretrained autoencoder, denoising wavelet filter, and DDSP are all capable of successfully obfuscating the steganography within the audio files without sacrificing the quality of the audio, with respect to the BER, MSE, and PSNR metrics. However, the upsampling using bicubic interpolation method provides worse MSE and PSNR in comparison to the other techniques. This shows that those models are generalized and remove steganographic content in various file types and steganography algorithms. Although the wavelet denoising filter has slightly better metrics than the DDSP and the pretrained autoencoder, we believe that the DDSP model would greatly outperform wavelet filtering if trained to simultaneously remove image and audio steganography and appropriately handle 1-D signals as input.

TABLE III

Transfer Learning Results on the VoxCeleb 1 Dataset

| Model | BER | MSE | PSNR |
|---|---|---|---|
| DDSP | 0.67 | 650.12 | 37.28 |
| AutoEncoder | 0.67 | 650.14 | 37.28 |
| Wavelet Filter | 0.67 | 643.94 | 37.65 |
| Bicubic Inter. | 0.64 | 1157.01 | 35.54 |

The computer program code for performing the specialized functions described herein can be stored on a non-transitory computer-readable medium, such as the memory device 112, which may be memory semiconductors (e.g., DRAMs, etc.) or other non-transitory means for providing software to the processing device 108. The computer programs (e.g., computer control logic) or software may be stored in a memory device 132. The computer programs may also be received via a communications interface. Such computer programs, when executed, may enable the steganography purification device 100 to implement the present methods and exemplary embodiments discussed herein. Accordingly, such computer programs may represent controllers of the steganography purification device 100. Where the present disclosure is implemented using software, the software may be stored in a computer program product or non-transitory computer readable medium and loaded into the steganography purification device 100 using a removable storage drive, an interface, a hard disk drive, or communications interface, where applicable.

The processing device 108 can include one or more modules or engines configured to perform the functions of the exemplary embodiments described herein. Each of the modules or engines may be implemented using hardware and, in some instances, may also utilize software, such as corresponding to program code and/or programs stored in memory. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the processing device 108 to perform the functions disclosed herein. It will be apparent to persons having skill in the relevant art that such processes result in the processing device 108 being a specially configured computing device uniquely programmed to perform the functions described above.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

REFERENCES

Each of the following references is incorporated by reference in its entirety.

[1] I. Cox, M. Miller, J. Bloom, J. Fridrich, and T. Kalker, Digital watermarking and steganography. Morgan kaufmann, 2007.

[2] "Apt37." [Online]. Available: https://attack.mitre.org/groups/G0067/

[3] W. Bender, D. Gruhl, N. Morimoto, and A. Lu, "Techniques for data hiding," IBM systems journal, vol. 35, no. 3.4, pp. 313-336, 1996.

[4] I. Goodfellow, J. Pouget-Abadie, M. Mirza, B. Xu, D. Warde-Farley, S. Ozair, A. Courville, and Y. Bengio, "Generative adversarial nets," in Advances in neural information processing systems, 2014, pp. 2672-2680.

[5] A. Westfeld and A. Pfitzmann, "Attacks on steganographic systems," in International workshop on information hiding. Springer, 1999, pp. 61-76.

[6] D. Jung, H. Bae, H.-S. Choi, and S. Yoon, "Pixelsteganalysis: Destroying hidden information with a low degree of visual degradation," arXiv preprint arXiv:1902.11113, 2019.

[7] T. Salimans, A. Karpathy, X. Chen, and D. P. Kingma, "Pixelcnn++: Improving the pixelcnn with discretized logistic mixture likelihood and other modifications," arXiv preprint arXiv:1701.05517, 2017.

[8] S. Baluja, "Hiding images in plain sight: Deep steganography," in Advances in Neural Information Processing Systems, 2017, pp. 2069-2079.
[9] R. Zhang, S. Dong, and J. Liu, "Invisible steganography via generative adversarial networks," Multimedia Tools and Applications, vol. 78, no. 7, pp. 8559-8575, 2019.
[10] P. Amritha, M. Sethumadhavan, R. Krishnan, and S. K. Pal, "Anti-forensic approach to remove stego content from images and videos," Journal of Cyber Security and Mobility, vol. 8, no. 3, pp. 295-320, 2019.
[11] P. Amritha, M. Sethumadhavan, and R. Krishnan, "On the removal of steganographic content from images," Defence Science Journal, vol. 66, no. 6, pp. 574-581, 2016.
[12] S. Y. Ameen and M. R. Al-Badrany, "Optimal image steganography content destruction techniques," in International Conference on Systems, Control, Signal Processing and Informatics, 2013, pp. 453-457.
[13] A. Sharp, Q. Qi, Y. Yang, D. Peng, and H. Sharif, "A novel active warden steganographic attack for next-generation steganography," in 2013 9th International Wireless Communications and Mobile Computing Conference (IWCMC). IEEE, 2013, pp. 1138-1143.
[14] F. Al-Naima, S. Y. Ameen, and A. F. Al-Saad, "Destroying steganography content in image files," in The 5th International Symposium on Communication Systems, Networks and DSP (CSNDSP'06), Greece, 2006.
[15] P. L. Shrestha, M. Hempel, T. Ma, D. Peng, and H. Sharif, "A general attack method for steganography removal using pseudo-cfa re-interpolation," in 2011 International Conference for Internet Technology and Secured Transactions. IEEE, 2011, pp. 454-459.
[16] P. Amritha, K. Induj a, and K. Raj eev, "Active warden attack on steganography using prewitt filter," in Proceedings of the International Conference on Soft Computing Systems. Springer, 2016, pp. 591-599.
[17] C. B. Smith and S. S. Agaian, "Denoising and the active warden," in 2007 IEEE International Conference on Systems, Man and Cybernetics. IEEE, 2007, pp. 3317-3322.
[18] C. Ledig, L. Theis, F. Husz'ar, J. Caballero, A. Cunningham, A. Acosta, A. Aitken, A. Tejani, J. Totz, Z. Wang et al., "Photo-realistic single image super-resolution using a generative adversarial network," in Proceedings of the IEEE conference on computer vision and pattern recognition, 2017, pp. 4681-4690.
[19] K. He, X. Zhang, S. Ren, and J. Sun, "Deep residual learning for image recognition," in Proceedings of the IEEE conference on computer vision and pattern recognition, 2016, pp. 770-778.
[20] P. Bas, T. Filler, and T. Pevn'y, ""break our steganographic system": the ins and outs of organizing boss," in International workshop on information hiding. Springer, 2011, pp. 59-70.
[21] T. Pevn'y, T. Filler, and P. Bas, "Using high-dimensional image models to perform highly undetectable steganography," in International Workshop on Information Hiding. Springer, 2010, pp. 161-177.
[22] B. Li, M. Wang, J. Huang, and X. Li, "A new cost function for spatial image steganography," in 2014 IEEE International Conference on Image Processing (ICIP). IEEE, 2014, pp. 4206-4210.
[23] V. Holub, J. Fridrich, and T. Denemark, "Universal distortion function for steganography in an arbitrary domain," EURASIP Journal on Information Security, vol. 2014, no. 1, p. 1, 2014.
[24] V. Holub and J. Fridrich, "Designing steganographic distortion using directional filters," in 2012 IEEE International workshop on information forensics and security (WIFS). IEEE, 2012, pp. 234-239.
[25] J. Fridrich, "Steganographic algorithms." [Online]. Available: http://dde.binghamton.edu/download/stego algorithms/
[26] V. Nair and G. E. Hinton, "Rectified linear units improve restricted boltzmann machines," in Proceedings of the 27$^{th}$ international conference on machine learning (ICML-10), 2010, pp. 807-814.
[27] D. P. Kingma and J. Ba, "Adam: A method for stochastic optimization," arXiv preprint arXiv:1412.6980, 2014.
[28] Z. Wang, A. C. Bovik, H. R. Sheikh, E. P. Simoncelli et al., "Image quality assessment: from error visibility to structural similarity," IEEE transactions on image processing, vol. 13, no. 4, pp. 600-612, 2004.
[29] Z. Wang and A. C. Bovik, "A universal image quality index," IEEE signal processing letters, vol. 9, no. 3, pp. 81-84, 2002.
[30] I. Daubechies, Ten lectures on wavelets. Siam, 1992, vol. 61.
[31] S. G. Chang, B. Yu, and M. Vetterli, "Adaptive wavelet thresholding for image denoising and compression," IEEE transactions on image processing, vol. 9, no. 9, pp. 1532-1546, 2000.
[32] P. Wayner, Disappearing cryptography: information hiding: steganography and watermarking. Morgan Kaufmann, 2009.
[33] "Msfvenom." [Online]. Available: https://www.offensivesecurity.com/metasploit-unleashed/msfvenom/
[34] A. Nagrani, J. S. Chung, and A. Zisserman, "Voxceleb: a largescale speaker identification dataset," in INTERSPEECH, 2017.
[35] S. Butterworth et al., "On the theory of filter amplifiers," Wireless Engineer, vol. 7, no. 6, pp. 536-541, 1930.
[36] O. M. Essenwanger, "Elements of statistical analysis," 1986.

What is claimed is:

1. A system for removing steganography from a digital data, the system comprising:
a receiving device configured to receive digital data including at least one of image data and audio data; and
at least one processing device configured to access a steganography purifier model having at least a generator configured to: scale a magnitude of individual data elements of the digital data from a first value range to a second value range, downsample the scaled data elements to remove steganography data embedded in the digital data and produce a purified version of the digital data, upsample the purified version of the digital data by interpolating new data elements between one or more adjacent data elements to provide an upsampled purified version of the digital data, and scale the data elements of the upsampled purified version of the digital data from the second value range to the first value range to generate a purified output version of the received digital data.

2. The system according to claim 1, wherein the received digital data includes image data and the individual elements of the digital data are pixels.

3. The system according to claim 2, wherein if the image data includes video image data, the system comprising:
a front-end device configured to parse the video image into a plurality of image frames and feed each image frame to the at least one processing device as the digital data.

4. The system according to claim 2, wherein the magnitude of the individual data elements are scaled from a first value within the first value range of 0 to 255 to a second value within the second value range of 0 to 1.

5. The system according to claim 1, wherein the received digital data includes audio data.

6. The system according to claim 5, comprising:
a front-end device configured to reshape a vector of the audio data into a matrix format and feed the matrix to the at least one processor as the digital data.

7. The system according to claim 6, wherein each individual element of the digital data is a sample of the audio data.

8. The system according to claim 6, wherein the at least one processor is configured to generate the purified image as a matrix and reshape the matrix into a vector to generate purified audio data.

9. The system according to claim 1, wherein steganography purifier model of the at least one processing device includes a discriminator configured to distinguish between the purified image generated by the generator and a cover image of the digital data during a training mode.

10. A method for removing steganography from digital data, comprising:
receiving, in a receiving device digital data including at least one of image data and audio data;
scaling, in at least one processing device which having an encoder of a steganography purifier model, a magnitude of individual data elements of the digital data from a first value range to a second value range;
downsampling, in the encoder architecture of the at least one processing device, the scaled data elements to remove steganography data embedded in the digital data and produce a purified version of the digital data;
upsampling, in the at least one processing device having a decoder of a steganography purifier model, the purified version of the digital data by interpolating new data elements between one or more adjacent data elements to provide an upsampled purified version of the digital data; and
scaling, in the decoder architecture of the at least one processing device, the data elements of the upsampled purified version of the digital data from the second value range to the first value range to generate a purified output version of the received digital data.

11. The method according to claim 10, wherein if the image data includes a video image data, the method comprises:
parsing, in a front end device, the video image into a plurality of image frames; and
feeding each image frame to the at least one processing device as a digital data.

12. The method according to claim 11, wherein if the received digital data includes audio data, the method comprises:
reshaping, in a front-end device, a vector of the audio data to a matrix format, and
feeding the matrix to the at least one processing device as the digital data.

13. The method according to claim 12, wherein the purified output version of the received digital data is generated as a matrix of values, the method comprising:
reshaping the matrix into a vector to generate purified audio data.

14. The method according to claim 13, wherein the digital data is received in a data signal and formatted according to an application program interface.

15. The method according to claim 10, wherein scaling a magnitude of individual data elements of the digital dataset from a first value range to a second value range, comprises:
scaling the magnitude of the individual data elements from a first value within the first value range of 0 to 255 to a second value within the second value range of 0 to 1.

16. A method of training a system for removing steganography from digital data, the system having a receiving device and at least one processing device accessing a steganography purifier model having at least a generator for generating purified digital data and a discriminator for distinguishing between the purified digital data and cover data, the method comprising:
receiving, in the receiving device, a plurality of digital datasets including steganography, each digital datasets including one of image data and audio data;
scaling, via the generator of the at least one processing device, a magnitude of individual data elements of the digital dataset from a first value range to a second value range;
downsampling, via the generator of the at least one processing device, the digital dataset with the scaled elements to remove steganography data embedded in the digital data and producing a purified version of the digital dataset;
upsampling, via the generator of the at least one processing device, the purified version of the digital dataset by interpolating data between one or more adjacent data elements to provide an upsampled purified version of the digital dataset;
scaling, via the generator of the at least one processing device, the data elements of the upsampled purified version from the second value range to the first value range to generate a purified output version of the received digital dataset;
receiving, in the discriminator of the at least one processing device, the purified output version of the received digital dataset and a reference digital dataset, which corresponds to the digital dataset received by the receiving device; and
determining, via the discriminator of the at least one processing device, which of the purified version of the received digital dataset and the reference digital dataset contained steganography.

17. The method according to claim 16, comprising:
feeding a determination result of the discriminator to the generator.

18. The method according to claim 17, comprising:
wherein the nodal weights of the generator are adjusted so that a subsequent purified digital dataset has less steganographic content than a previous purified digital dataset.

19. The method according to claim 16, comprising:
adjusting one or more nodal weights of the generator based on whether the determination result of the discriminator is correct.

20. The method according to claim 16, wherein if the image data includes video image data, the method comprises:
parsing, in a front end device, the video image into a plurality of image frames; and
feeding each image frame to the at least one processing device as a corresponding digital dataset.

21. The method according to claim 16, wherein if the received digital dataset includes audio data, the method comprises:
- reshaping, in a front-end device, a vector of the audio data to a matrix format, and
- feeding the matrix to the at least one processing device as a corresponding digital dataset.

22. The method according to claim 16, wherein the purified output version of the digital dataset is generated as a matrix of values, the method comprising:
- reshaping the matrix into a vector to generate a purified version of the audio data.

\* \* \* \* \*